United States Patent [19]

Lenzen

[11] Patent Number: 5,007,661
[45] Date of Patent: Apr. 16, 1991

[54] SAFETY APPARATUS

[75] Inventor: Reiner Lenzen, Almont, Mich.

[73] Assignee: TRW Vehicle Safety Systems Inc., Lyndhurst, Ohio

[21] Appl. No.: 352,758

[22] Filed: May 16, 1989

[51] Int. Cl.[5] .............................................. B60R 21/32
[52] U.S. Cl. ..................................... 280/735; 280/806; 180/282; 340/438; 102/275.8
[58] Field of Search ............... 280/734, 735, 736, 737, 280/738, 739, 740, 741, 742, 806; 102/530, 275.8; 180/268, 282; 307/10.1; 340/425.5, 438

[56] References Cited

U.S. PATENT DOCUMENTS

| | | | |
|---|---|---|---|
| 2,102,024 | 12/1937 | Pearsall | 102/275.1 |
| 2,649,311 | 8/1953 | Hetrick | 280/734 |
| 3,590,739 | 7/1971 | Persson . | |
| 3,663,035 | 5/1972 | Norton | 280/734 |
| 3,745,523 | 7/1973 | Lewis et al. | 340/438 |
| 3,815,935 | 6/1974 | Jones | 280/735 |
| 3,818,431 | 6/1974 | Hosaka | 340/438 |
| 4,005,876 | 2/1977 | Jorgensen et al. . | |
| 4,178,016 | 12/1979 | Andres et al. | 280/734 |
| 4,200,615 | 4/1980 | Hamilton et al. . | |
| 4,220,087 | 9/1980 | Posson . | |
| 4,359,715 | 11/1982 | Langer et al. | 280/735 |
| 4,381,829 | 5/1983 | Montaron | 280/735 |
| 4,394,033 | 7/1983 | Goetz et al. | 280/740 |
| 4,403,143 | 9/1983 | Walker et al. | 102/275.8 |
| 4,455,941 | 6/1984 | Walker et al. | 102/275.8 |
| 4,573,322 | 3/1986 | Fohl | 280/806 |
| 4,614,876 | 9/1986 | Mattes et al. | 280/806 |
| 4,664,033 | 5/1987 | Burkdoll et al. . | |
| 4,699,400 | 10/1987 | Adams et al. | 280/731 |
| 4,706,990 | 11/1987 | Stevens . | |
| 4,817,828 | 4/1989 | Goetz . | |

Primary Examiner—Charles A. Marmor
Assistant Examiner—Karin Tyson
Attorney, Agent, or Firm—Tarolli, Sundheim & Covell

[57] ABSTRACT

An apparatus is provided for monitoring the operability of at least a pair of pyrotechnic transmission lines connected to an actuatable safety device. The apparatus includes a conduit in the form of an optical fiber, which extends through one pyurotechnic transmission line, through the actuatable safety device, and through the other pyrotechnic transmission line. One end of the conduit is coupled to a signal source for receiving a signal from the signal source. The signal is directed through the conduit. A sensor coupled at the other end of the conduit senses receipt of the signal directed through the conduit. If the sensor senses the signal directed through the conduit has decreased to or below a predetermined level, then an indicator operates to warn of a break or interruption in at least one of the pyrotechnic transmission lines.

14 Claims, 4 Drawing Sheets

SAFETY APPARATUS

BACKGROUND OF THE INVENTION

Technical Field

The present invention relates to an apparatus for protecting an occupant of a vehicle during a collision, and is particularly directed to an apparatus for monitoring the operability of ignitable pyrotechnic transmission lines which, when ignited, actuate a vehicle safety device for protecting an occupant of a vehicle.

Background Art

There are many known ways of monitoring the operability of a vehicle safety device. U.S. Pat. No. 4,178,016 to Andres, et al. discloses a system for monitoring the operability of a vehicle restraint system. The restraint system is actuated upon ignition of a fuse cord. The monitoring system includes an electrical line extending along the fuse cord. An amplifier monitors the electrical signal carried by the electrical line. If the integrity of the fuse cord is destroyed, the signal carried by the electrical line changes. If the electrical signal changes, an indicator light goes on to indicate a defective fuse cord.

U.S. Pat. No. 4,455,941 to Walker, et al. discloses a system for monitoring the integrity of a detonating cord. The monitoring system includes a fiber optic cord located within the detonating cord. When a switch is depressed, a light source at one end of the fiber optic cord is turned on. Light is conducted through the fiber optic cord to the other end of the fiber optic cord. A cover at the other end of the fiber optic cord has a phosphorescent coating which emits light after the light source is turned off. Light emitted from the coating on the cover is then conducted back through the fiber optic cord to an optical receiver. If the detonating cord breaks, the fiber optic cord breaks, and the optical receiver will not receive any light and will indicate a failure of the detonating cord.

Summary of the Invention

In accordance with the present invention, an apparatus includes an actuatable safety device for protecting an occupant of a vehicle. The apparatus further includes at least a pair of pyrotechnic transmission lines. One end of each pyrotechnic transmission line is connected to the safety device. Ignition of either pyrotechnic transmission line effects actuation of the safety device. The apparatus also includes signal means for providing a signal, preferably a light signal. Conduit means is coupled at one end to the signal means for receiving the signal from the signal means and extends through one pyrotechnic transmission line, through at least a portion of the actuatable safety device, and through the other pyrotechnic transmission line. The conduit means conducts the signal received from the signal means. Sensor means is coupled to the other end of the conduit means for sensing receipt of the signal conducted through the conduit means. Indicator means responsive to the sensor means is provided for indicating a change in the signal directed through the conduit means. Thus, if either of the pyrotechnic transmission lines breaks or is interrupted, the sensor means will sense a change in the signal conducted through the conduit means and the indicator means will provide an indication of such change.

Also, in accordance with the present invention, an apparatus includes an actuatable airbag inflator for, when actuated, inflating an airbag to protect an occupant of a vehicle during a collision. The apparatus further includes an actuatable seat belt pretensioner for, when actuated, rotating a spool of a seat belt retractor in a belt retraction direction. A first ignitable pyrotechnic transmission line has one end connected to the actuatable airbag inflator and, when ignited, actuates the airbag inflator. A second ignitable pyrotechnic transmission line has one end connected to the actuatable seat belt pretensioner and, when ignited, actuates the seat belt pretensioner. A firing manifold connected to the other end of the first ignitable pyrotechnic transmission line and to the other end of the second ignitable pyrotechnic transmission line receives a firing signal indicative of a vehicle collision. The first and second pyrotechnic transmission lines ignite in response to the firing manifold receiving the firing signal and thereby actuate the seat belt pretensioner and the airbag inflator to protect the occupant of the vehicle during the collision.

Also, in accordance with the present invention, an apparatus includes actuatable means for, when actuated, providing protection for the occupant of a vehicle during a collision condition. A first ignitable pyrotechnic transmission line has one end connected to the actuatable means and, when ignited, actuates the actuatable means. A second ignitable pyrotechnic transmission line has one end connected to the actuatable means and, when ignited, also actuates the actuatable means. Thus, the actuatable means actuates in response to either one or both of the first and second pyrotechnic transmission lines igniting. A firing manifold connected to the other end of the first ignitable pyrotechnic transmission line and to the other end of the second ignitable pyrotechnic transmission line receives a firing signal indicative of a vehicle collision. The first and second pyrotechnic transmission lines ignite in response to the firing manifold receiving the firing signal and thereby actuate the actuatable means to protect the occupant of the vehicle during the collision.

BRIEF DESCRIPTION OF THE DRAWINGS

The foregoing and other features and advantages of the present invention will become apparent to one skilled in the art to which the present invention relates from reading the following description of preferred embodiments of the present invention with reference to the accompanying drawings, wherein.

DETAILED DESCRIPTION OF PREFERRED EMBODIMENTS

Figure 1:
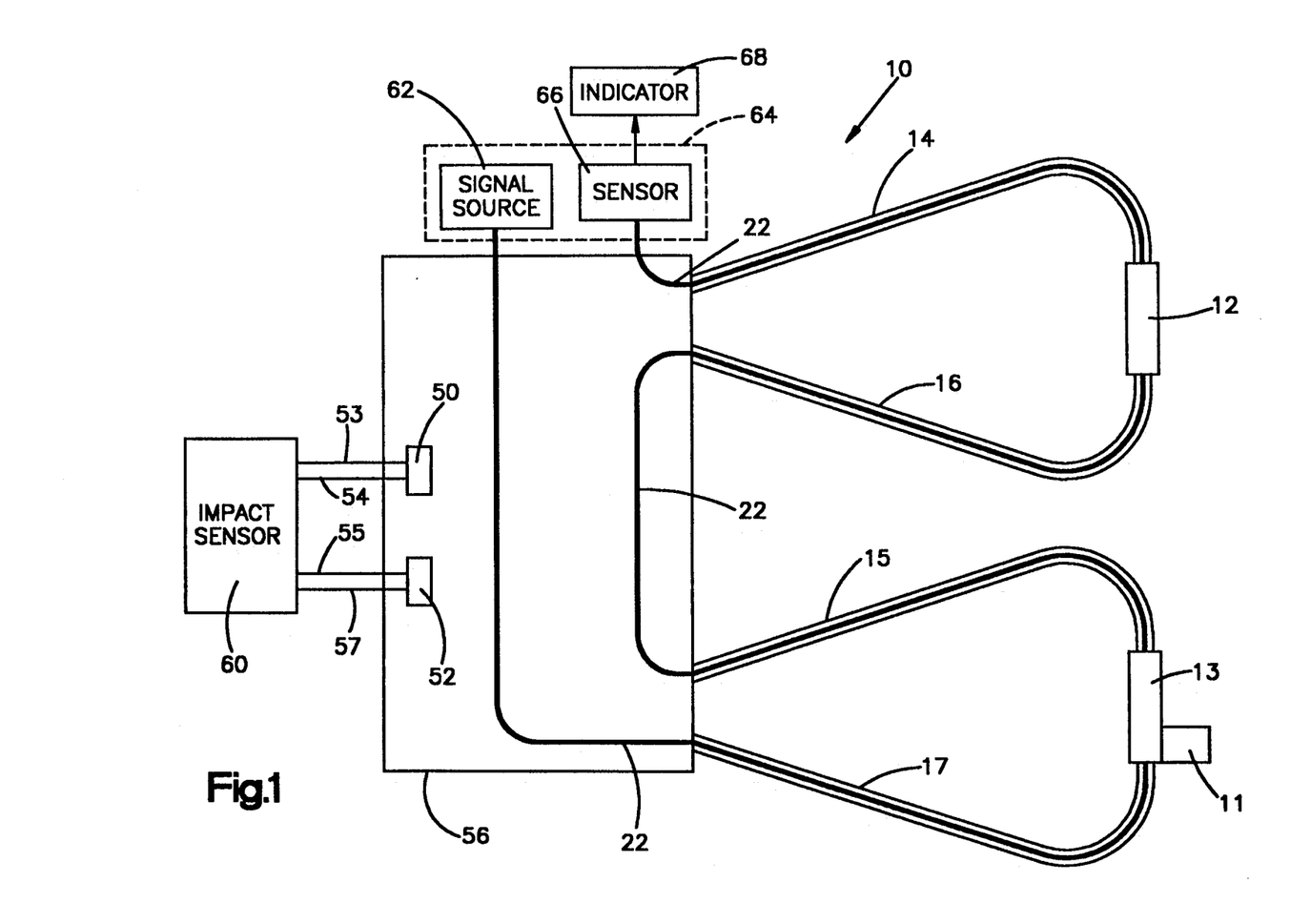
FIG. 1 is a schematic diagram of a portion of a vehicle safety system incorporating an apparatus constructed in accordance with the present invention.

As shown in FIG. 1, a vehicle safety system 10 includes an actuatable seatbelt pretensioner 13 having a pair of ignitable pyrotechnic transmission lines 15, 17 connected to the pretensioner 13. The pretensioner 13 actuates in response to ignition of either one or both of the pyrotechnic transmission lines 15, 17. The pretensioner 13, when actuated, acts to rotate a spool of a seat belt retractor 11 in a belt retraction direction. A known seat belt pretensioner is disclosed in U.S. Pat. No. 4,573,322 entitled "Driving Device Especially for Return Stiffening of a Safety Belt in an Automatic Safety Belt Wind-Up Device", and issued on Mar. 4, 1986. The structure and operation of seat belt pretensioners are well known and, therefore, will not be described herein.

The vehicle safety system 10 further includes an actuatable airbag inflator 12 having a pair of ignitable pyrotechnic transmission lines 14, 16 connected to the inflator 12. The pyrotechnic transmission lines 14, 16 are connected to axially opposite ends of the inflator 12. The inflator 12 actuates in response to ignition of either one or both of the pyrotechnic transmission lines 14, 16. The inflator 12, when actuated, acts to generate a gas which is directed into the interior of an inflatable airbag (not shown) of the vehicle safety system 10. The airbag inflates to protect a vehicle occupant during a vehicle collision.

Each of the pyrotechnic transmission lines 14, 15, 16, 17 is made of an ignitable pyrotechnic material suitable for transmitting an explosive energy signal therethrough. An example of such a material is "TLX" (trademark, Explosive Technology, Inc. of Fairfield, California). A TLX pyrotechnic transmission line includes a tube made of a plastic material which can withstand high temperature, such as "KYNAR" (trademark, E. I. DuPont de Nemours & Co. of Wilmington, Delaware) or "HALAR" (trademark, E. I. DuPont de Nemours & Co. of Wilmington, Delaware), on which a reactive coating is disposed. An example of the reactive coating is made of a material including 10.5% aluminum powder and 89.5% "HMX". HMX is cyclotetramethylenetetranitramine. The velocity of the ignition of a TLX pyrotechnic transmission line is in the range of 5,000-6,000 feet/second.

Another suitable pyrotechnic material for the pyrotechnic transmission lines 14, 15, 16, 17 is "NONEL" (trademark, The Ensign-Bickford Co. of Simsbury, Connecticut). NONEL is similar to TLX except that NONEL has an inner tube made of "SURLYN" (trademark, E. I. DuPont de Nemours & Co. of Wilmington, Delaware). NONEL has an outer tube made of polyvinylchloride or linear low density polyethylene. The velocity of the ignition of NONEL is about 6,000 feet/second.

Still another suitable pyrotechnic material for the pyrotechnic transmission lines 14, 15, 16, 17 is "BLASTMASTER" (trademark, The Atlas Powder Co. of Tamaqua, Pennsylvania). This product includes a small diameter tube with a filament disposed within the tube. The filament is preferably made of an inert strand coated with ammonium perchlorate and aluminum powder. The velocity of the ignition of a BLASTMASTER pyrotechnic transmission line is about 5,000 feet/second.

Figure 2:
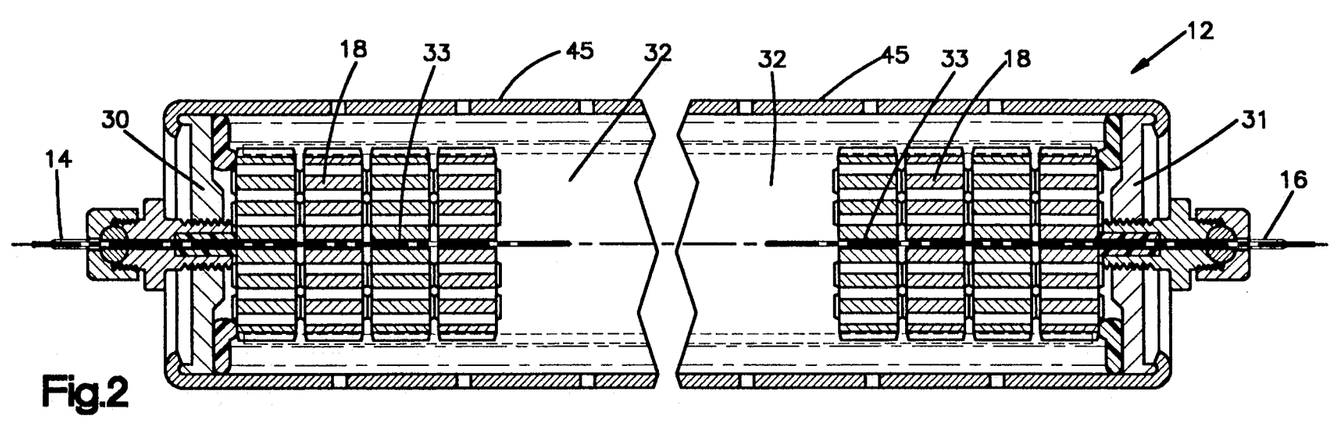
FIG. 2 is a sectional view of an inflator used in the vehicle safety system of FIG. 1.

Referring to FIG. 2, the inflator 12 includes a housing 45 and two end closures 30, 31. A chamber 32 is defined by the housing 45 and the two end closures 30, 31. The inflator 12 further includes ignitable gas-generating propellant grains 18 disposed within the chamber 32. The propellant grains 18 are arranged within the chamber 32 and have aligned central openings which define a central passage 33. The central passage 33 extends through the arrangement of propellant grains 18 from one portion of the chamber 32 to another portion of the chamber 32. The arrangement of the propellant grains 18 within the chamber 32 is known, and will not be described herein. One arrangement of propellant grains in an inflator is described in pending patent application Ser. No. 243,618, entitled "Igniter for an Inflatable Occupant Restraint", and filed on Sept. 13, 1988. The propellant grains 18 ignite when at least one of the pyrotechnic transmission lines 14, 16 ignites.

The inflator 12 is operatively connected with an inflatable airbag (not shown). When the propellant grains 18 ignite in response to at least one of the pyrotechnic transmission lines 14, 15, 16, 17 igniting, gases, flame and pressure are generated within the housing 45. The burning of the propellant grains 18 releases a sufficient amount of gas for inflating the airbag. The gas is delivered to the interior of the airbag to thereby inflate the airbag.

Figure 3:
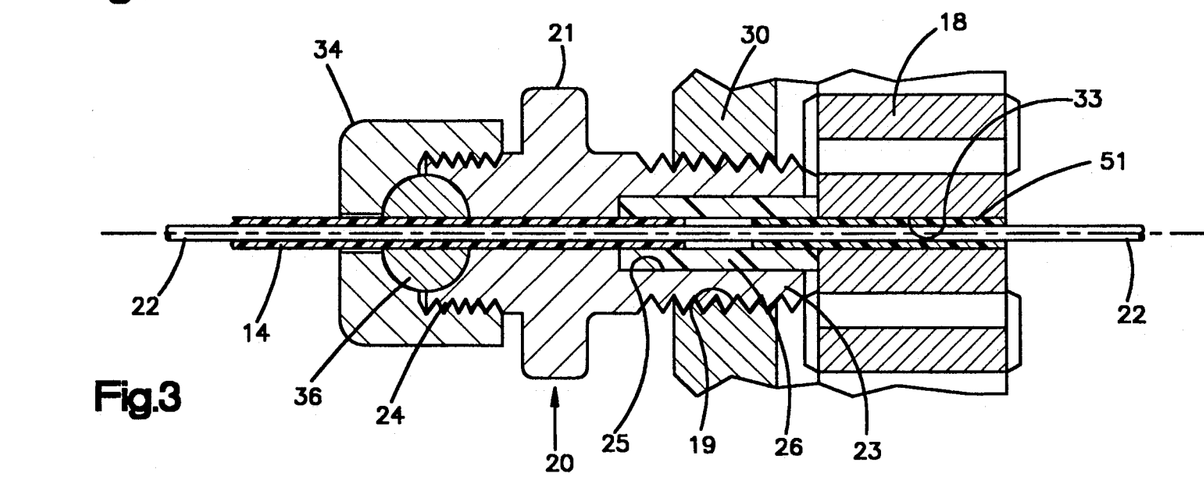
FIG. 3 is a detailed view of a portion of the inflator of FIG. 2 on an enlarged scale.

FIG. 3 illustrates the specific construction of the interconnection between the inflator 12 and the pyrotechnic transmission line 14. The interconnection between the inflator 12 and the other pyrotechnic transmission line 16 is the same. For simplicity, only the interconnection between the inflator 12 and the pyrotechnic transmission line 14 is described.

The end closure 30 has a threaded hole 19 into which a hex body 20 is screwed. The hex body 20 has a longitudinal central axis and has a hex-shaped portion 21 intermediate axially opposite end portions 23, 24. Each of the axially opposite end portions 23, 24 is threaded. The end portion 23 of the hex body 20 is fastened to the end closure 30 by screwing the end portion 23 into the threaded hole 19 in the end closure 30. The hex body 20 has a longitudinally extending bore 25 having an inner surface on which a small piece of tube 26 is secured. The tube 26 has an outer periphery and an inner periphery and is preferably made of a plastic material. The outer periphery of the tube 26 is bonded to the inner surface of the bore 25 by a suitable adhesive.

One end of the pyrotechnic transmission line 14 extends into one end portion of the tube 26 as shown in FIG. 3. The one end of the pyrotechnic transmission line 14 is secured to the inner periphery of the tube 26 by a suitable adhesive. A hex nut 34 is fastened to the end portion 24 of the hex body 20. When the hex nut 34 is tightened, a ferrule 36 located between the hex nut 34 and the hex body 20 is compressed between the hex nut 34 and the hex body 20 to provide a tight seal around the pyrotechnic transmission line 14.

An ignitable material 51 extends into the other end portion of the tube 26. An example of such an ignitable material is "ITLX" (trademark, Explosive Technology, Inc. of Fairfield, California). The ITLX 51 is a linear ignition material and includes by way of example an outer polypropylene tube or a linear low density polyethylene tube Additional reinforcement can be braided into the tube. A number of ignitable propellant cords (not shown) are disposed inside the tube. The ITLX includes a single or multiple fiberglass strand coated with aluminum and potassium perchlorate and/or aluminum and ammonium perchlorate. BLASTMASTER multi-strand igniter ("MSI") may also be used as a substitute for the ITLX. In BLASTMASTER, a nitrocellulose strand or strands are coated with aluminum and potassium perchlorate and/or ammonium perchlorate. The linear burn rate of the ignitable propellant cords is about 2,600 feet/second.

As shown in FIG. 3, the ITLX 51 is secured to the inner periphery of the tube 26 by a suitable adhesive material. The inner diameter of the tube 26 is selected so as to accommodate the outer diameter of the ITLX 51 and the outer diameter of the pyrotechnic transmission line 14. The ignitable propellant cords of the ITLX 51 ignite in response to ignition of the TLX pyrotechnic transmission line 14. The ignitable propellant cords of the ITLX 51 extend into at least one of the propellant grains 18 within the inflator 12. When the ITLX 51 ignites, the propellant grains 18 within the inflator 12 are ignited thereby to generate a gas to inflate an airbag.

Figure 4:
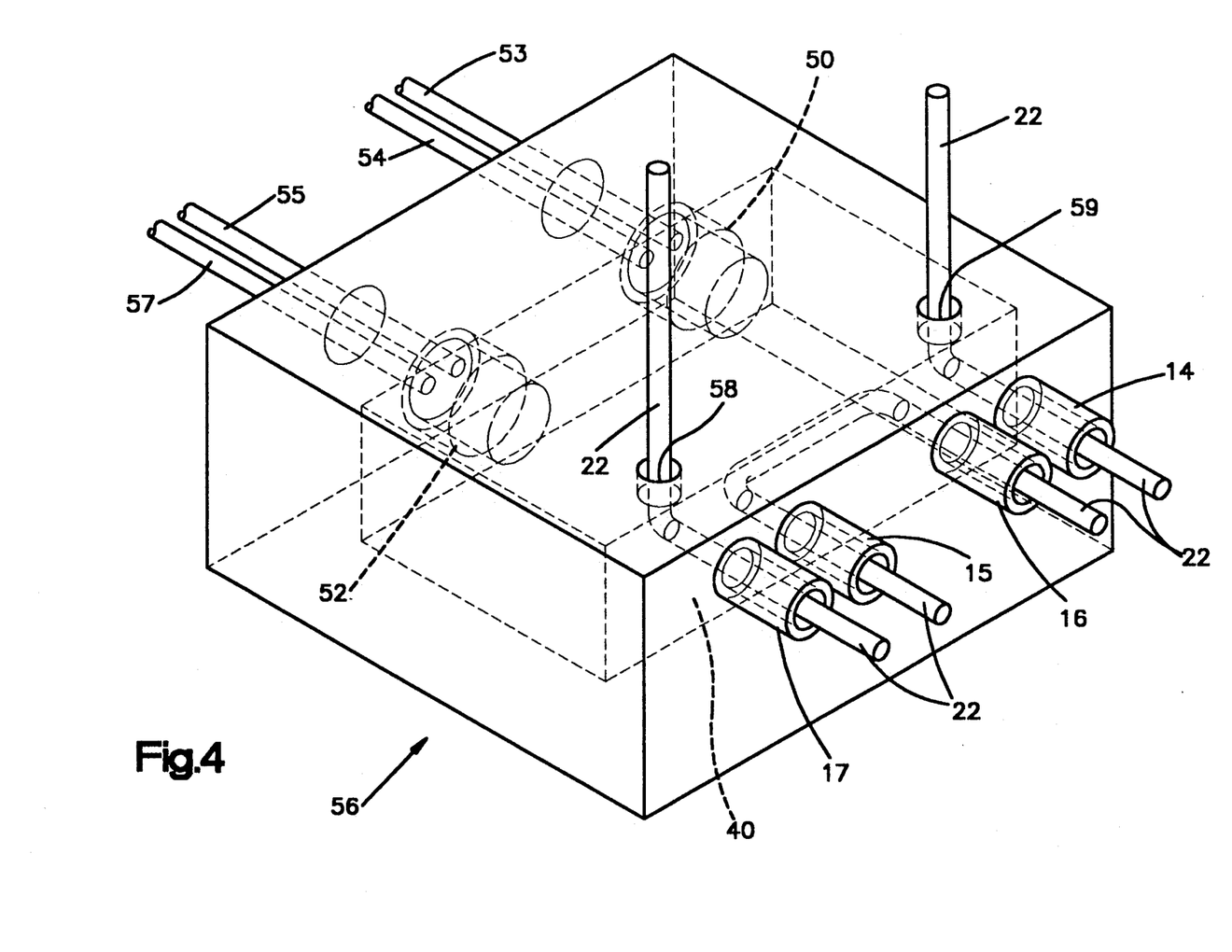
FIG. 4 is a schematic perspective view showing some parts of FIG. 1 on an enlarged scale.

Referring to FIGS. 1 and 4, the other ends of the pyrotechnic transmission lines 14, 16, i.e., the ends not connected to the axially opposite ends of the inflator 12, are connected to an end portion of a chamber 40 in a firing manifold 56. The firing manifold 56 is constructed of preferably metal and acts as a Faraday shield to protect against radio-frequency interference. The firing manifold 56 houses a pair of blasting caps 50, 52 known as microdets. The micodets 50, 52 are miniature blasting caps which ignite in response to a suitable energy signal. The microdets 50, 52 are spaced apart and are located at an end portion of the chamber 40 opposite to the connection of the pyrotechnic transmission lines 14, 16 to the chamber 40. When ignited, the microdets 50, 52 generate gas and flame. The gas and flame propagate through the chamber 40 and ignite the pyrotechnic transmission lines 14, 16. A pair of miniature squibs could be used instead of the microdets 50, 52.

Each of the microdets 50, 52 is electrically connected through an associated pair of parallel-connected electrical wires to an impact sensor 60. The microdet 50 is connected through the pair of electrical wires 53, 54 to the impact sensor 60, and the microdet 52 is connected through the pair of electrical wires 55, 57 to the impact sensor 60. The impact sensor 60 generates an electrical signal, herein referred to as a firing signal, in response to sensing a collision condition of the vehicle. The firing signal is transmitted over wires 53, 54, 55, 57 to ignite the microdets 50, 52.

The ignition of either one or both of the microdets 50, 52 results in the ignition of the two pyrotechnic transmission lines 14, 16. Each of the microdets 50, 52 acts as a backup for the other microdet. If one of the microdets 50, 52 does not ignite in response to the firing signal transmitted from the impact sensor 60, then the ignition of the other microdet results in the ignition of the two pyrotechnic transmission lines 14, 16. When the burning of the pyrotechnic transmission lines 14, 16 reaches the inflator 12, the ITLX material associated with each of the pyrotechnic transmission lines 14, 16 is ignited. When the associated ITLX material ignites, the propellant grains 18 within the inflator 12 ignite. Thus, the ignition of the pyrotechnic transmission lines 14, 16 ignites the associated ITLX material which in turn ignites the propellant grains 18 within the inflator 12.

At the same time the two pyrotechnic transmission lines 14, 16 connected to the inflator 12 ignite, the two pyrotechnic transmission lines 15, 17 connected to the pretensioner 13 ignite. Upon ignition of one or both of the pyrotechnic transmission lines 15, 17, ignitable material (not shown) within the pretensioner 13 is ignited. The pretensioner 13 is actuated by the ignition of the ignitable material to rotate a spool of the seat belt retractor 11 in a belt retraction direction.

Although only the inflator 12 and the pretensioner 13 are shown in FIG. 1 as being connected to the firing manifold 56, it is conceivable that additional actuatable safety devices could be similarly connected to the firing manifold 56 by providing additional ports to the chamber 40 of the firing manifold 56. For example, another inflator with dual pyrotechnic transmission lines and another pretensioner with dual pyrotechnic transmission lines could be connected to the firing manifold 56 by adding two dual ports to the chamber 40 of the firing manifold 56. All pyrotechnic transmission lines connected with the firing manifold 56 are connected so that ignition of either one or both of the microdets 50, 52 will result in ignition of all of the pyrotechnic transmission lines to each actuatable safety device. The connection of dual pyrotechnic transmission lines to each actuatable safety device and the use of dual microdets combine to provide a redundant ignition system for the vehicle safety system 10.

Referring to FIGS. 1-4, an apparatus is shown for monitoring the operability of the pyrotechnic transmission lines 14, 15, 16, 17 connected with the firing manifold 56. A conduit 22 for carrying a signal extends through a receiving hole 58 (FIG. 4) in the firing manifold 56, through the pyrotechnic transmission line 17, through the pretensioner 13, through the pyrotechnic transmission line 15, and then back to the firing manifold 56. The conduit 22 then extends through the pyrotechnic transmission line 16, through the inflator 12 including the central passage 33, through the pyrotechnic transmission line 14, back to the firing manifold 56, and out through an opening 59 in the firing manifold 56. The specific construction of the conduit 22 may vary. The conduit 22 is preferably an optical waveguide such as an optical fiber.

One end of the conduit 22 is connected to a light signal source 62 which provides a light signal for transmission through the conduit 22. The light signal source 62 is preferably a portion of a diagnostic module 64 for use with the vehicle safety system 10. The conduit 22 conducts the light signal to the other end of the conduit 22, which is coupled to a light sensor 66 such as a conventional photocell. An input of the light sensor 66 receives the light signal conducted through the conduit 22 from the signal source 62. An output of the light sensor 66 is connected with an indicator 68, such as a lamp, located in the vehicle compartment. The light sensor 66 is also preferably a portion of the diagnostic module 64. If the input of the light sensor 66 ceases to receive a light signal directed through the conduit 22, then the light sensor 66 generates a signal at its output and transmits this output signal to the indicator 68. The indicator 68 located in the vehicle compartment illuminates to warn the vehicle occupant that the input of the light sensor 66 has ceased to receive the light signal directed through the conduit 22.

If the continuity of the signal directed through the conduit 22 is interrupted or broken, as when there is a break in one or more of the pyrotechic transmission lines 14, 15, 16, 17, the inflator 12 or the pretensioner 13 may not actuate in response to a firing signal from the impact sensor 60. A break in any one the pyrotechnic transmission lines 14, 15, 16, 17 affects the operational readiness of the vehicle safety system 10. Thus, by directing the light signal from the light signal source 62 through the conduit 22, sensing the light signal, and then providing an indication of a break or interruption of the light signal, the operational readiness of the vehicle safety system 10 is determined.

The arrangement and cooperation of the light signal source 62, the conduit 22, the light sensor 66, and the indicator 68 within the vehicle safety system 10, as described hereinbefore, provides a method of monitoring whether the TLX pyrotechnic transmission lines 14, 15, 16, 17 and their associated ignitable ITLX material are in operable condition without interfering with their functionality. The monitoring is performed through a continuity check of the TLX pyrotechnic transmission lines 14, 15, 16, 17 and the associated ITLX material. If a break or interruption occurs in the TLX pyrotechnic transmission lines 14, 15, 16, 17 or the associated ITLX material, an indication of such a break or interruption is provided by a lamp in the vehicle compartment to inform the vehicle operator that service is needed.

The light sensor 66 may be responsive to a change in magnitude of the signal directed through the pyrotechnic transmission lines. For example, the light sensor 66 may provide an output signal indicative of a fault condition in any one of the pyrotechnic transmission lines 14, 15, 16, 17 if the light sensor 66 senses that the magnitude of the light signal directed through the pyrotechnic transmission lines has diminished to a predetermined level. Also, although the diagnostics module 64, the firing manifold 56 and the impact sensor 60 are shown as separate items in FIG. 1, the diagnostics module 64 and the impact sensor 60 could be combined as one unit and located within the firing manifold 56. The combination of the diagnostic module 64 and the impact sensor 60 may be in the form of a potted circuit board mounted within a portion of the firing manifold 56. By combining the diagnostic module 64 and the impact sensor 60 as one unit and locating the unit within the firing manifold 56, the diagnostic module 64 and the impact sensor 60 are also protected against radio-frequency interference by the firing manifold 56 acting as a Faraday shield.

It will be appreciated that the pyrotechnic transmission lines 14, 16 are redundant for the purpose of igniting the propellant grains 18 within the inflator 12. Hence, even if one of the pyrotechnic lines 14, 16 were to break, the propellant grains 18 within the inflator 12 would still ignite in response to actuation of either one or both microdets 50, 52 through the pyrotechnic transmission line which is not broken. Similarly, the pyrotechnic transmission lines 15, 17 are redundant for the purpose of igniting the ignitable material within the pretensioner 13. Further, if additional actuatable safety devices are connected with the firing manifold 56, then the conduit 22 would extend also through the pyrotechnic transmission lines associated with the additional actuatable safety devices in the same manner as described for the inflator 12 and the pretensioner 13.

Figure 5:
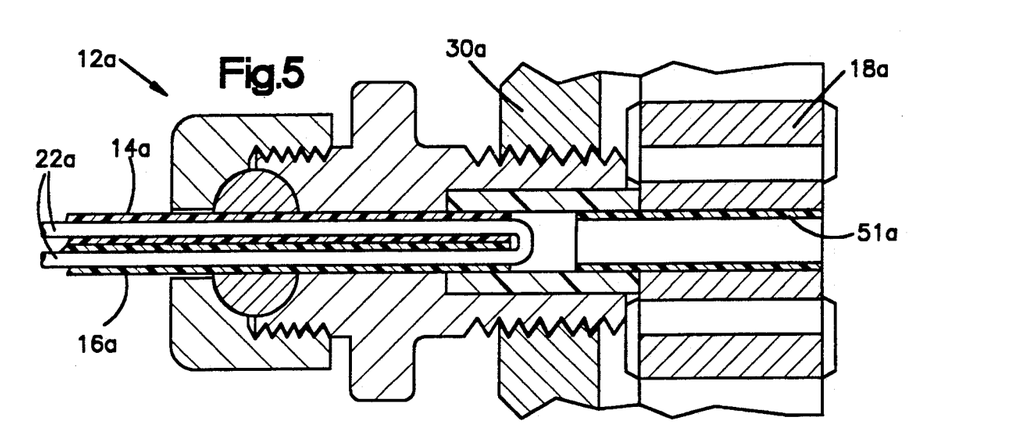
FIG. 5 is a sectional view of a portion of an inflator similar to FIG. 2 illustrating a second embodiment of the present invention.

A second embodiment of the present invention is illustrated in FIG. 5. Since the embodiment illustrated in FIG. 5 is generally similar to the embodiment illustrated in FIGS. 1-4, similar numerals are utilized to designate similar components, the suffix letter "a" being added to the numerals associated with the embodiment of FIG. 5.

As shown in FIG. 5, the two pyrotechnic transmission lines 14a, 16a enter and exit the inflator 12a at only one end of the inflator 12a. The two pyrotechnic transmission lines 14a, 16a are molded together with the signal carrying conduit 22a bending 180° at the end closure 30a of the inflator 12a. Thus, the conduit 22a does not extend through the inflator 12a.

Figure 6:
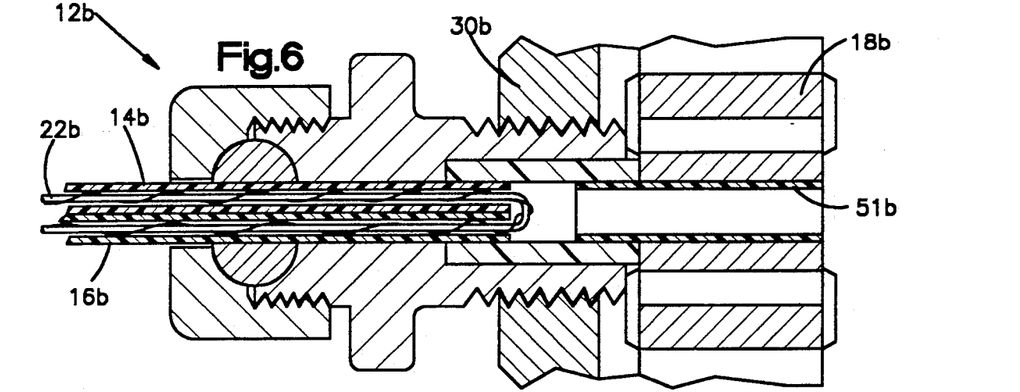
FIG. 6 is a sectional view of a portion of an inflator similar to FIG. 2 illustrating a third embodiment of the present invention.

A third embodiment of the present invention is illustrated in FIG. 6. Since the embodiment illustrated in FIG. 6 is generally similar to the embodiment illustrated in FIGS. 1-4, similar numerals are utilized to designate similar components, the suffix letter "b" being added to the numerals associated with the embodiment of FIG. 6.

As shown in FIG. 6, the two pyrotechnic transmission lines 14b, 16b are molded together with the signal carrying conduit 22b bending 180° at the end closure 30b of the inflator 12b. The two pyrotechnic transmission lines 14b, 16b are made of the BLASTMASTER material as described hereinabove. The filament of the BLASTMASTER pyrotechnic transmission lines 14b, 16b is wrapped around the conduit 22b as shown in FIG. 6. When the tube of the BLASTMASTER pyrotechnic transmission lines 14b, 16b ignites, the filament burns within the tube.

Figures 7, 8:
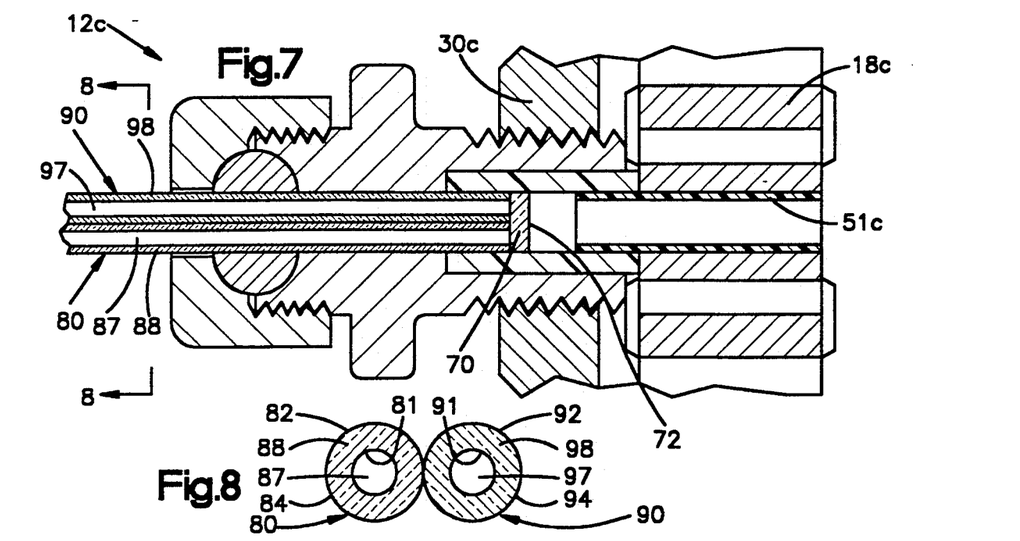
FIG. 7 is a sectional view of a portion of an inflator similar to FIG. 2 illustrating a fourth embodiment of the present invention.
FIG. 8 is a cross-sectional view taken approximately along the line 8—8 of FIG. 7.

A fourth embodiment of the present invention is illustrated in FIGS. 7 and 8. Since the embodiment illustrated in FIGS. 7 and 8 is generally similar to the embodiment illustrated in FIGS. 1-4, similar numerals are utilized to designate similar components, the suffix letter "c" being added to the numerals associated with the embodiment of FIGS. 7 and 8.

As shown in FIGS. 7 and 8, a tube 90 includes an inner cylindrical surface 91 and an outer cylindrical surface 92. A cross-sectional area 98 is defined between the inner surface 91 and the outer surface 92 and extends along the axial length of the tube 90. The inner surface 91 defines a chamber in which aluminum powder and HMX are located and form a pyrotechnic transmission line 97. The cross-sectional area 98 of the tube 90 along the axial length of the tube 90 is the fiber optic area through which a light signal is directed. An outer black cladding 94 is wrapped around the outer surface 92 of the tube 90 to prevent escape of light from within the fiber optic area 98 when a light signal is directed through the fiber optic area 98.

A tube 80 is adjacent to and aligned parallel with the tube 90. The construction of the tube 80 is the same as the construction of the tube 90. The tube 80 includes an inner cylindrical surface 81 and an outer cylindrical surface 82. A cross-sectional area 88 is defined between the inner surface 81 and the outer surface 82 and extends along the axial length of the tube 80. The inner surface 81 defines a chamber in which aluminum powder and HMX are located and form a pyrotechnic transmission line 87. The cross-sectional area 88 of the tube 80 along the axial length of the tube 80 is the fiber optic area through which a light signal is directed. An outer black cladding 84 is wrapped around the outer surface 82 of the tube 80 to prevent escape of light from within the fiber optic area 88 when a light signal is directed through the fiber optic area 88.

The two tubes 80, 90 are molded together. One end of the tube 90 and one end of the tube 80 extend into the inflator 12c as shown in FIG. 7. A thin translucent piece of material 70 is connected between the one end of the tube 90 and the one end of the tube 80. The translucent piece of material 70 couples the two tubes 80, 90 and transmits the directed light signal from one tube to the other tube. A wall 72 of the translucent piece of material 70 may be clad to prevent escape of light.

This invention has been described above with reference to preferred embodiments. Modifications and alterations may become apparent to one skilled in the art upon reading and understanding the specification. It is intended to include all such modifications and alterations within the scope of the appended claims.

Having described specific preferred embodiments of the invention, the following is claimed:

1. An apparatus comprising:
   an actuatable safety device for protecting an occupant of a vehicle;
   at least a pair of ignitable pyrotechnic transmission lines, one end of each pyrotechnic transmission line being connected to said safety device, ignition of either pyrotechnic transmission line effecting actuation of said safety device;
   signal means for providing a signal;
   conduit means coupled at one end to said signal means for receiving said signal from said signal means and extending through one pyrotechnic transmission line, through at least a portion of the actuatable safety device, and through the other pyrotechnic transmission line, said conduit means conducting said signal received from said signal means;
   sensor means coupled to the other end of said conduit means for sensing receipt of said signal conducted through said conduit means; and
   indicator means responsive to said sensor means for indicating a change in said signal conducted through said conduit means.

2. The apparatus of claim 1 further comprising manifold means connected to the other end of each of said pair of pyrotechnic transmission lines for receiving a firing signal indicative of a vehicle collision, said pair of pyrotechnic transmission lines igniting in response to said manifold means receiving said firing signal and thereby actuating said safety device to protect the occupant of the vehicle during the collision.

3. The apparatus of claim 1 wherein said signal means is a portion of a diagnostic module for use with a vehicle safety system.

4. The apparatus of claim 1 wherein said sensor means is a portion of a diagnostic module for use with a vehicle safety system.

5. The apparatus of claim 1 wherein said signal means is a light source and said conduit means includes an optical fiber extending through the one pyrotechnic transmission line, through the actuatable safety device, and through the other pyrotechnic transmission line.

6. The apparatus of claim 1 wherein said conduit means includes a single signal-carrying member extending through the one pyrotechnic transmission line, through the actuatable safety devices and through the other pyrotechnic transmission line.

7. The apparatus of claim 1 wherein said actuatable safety device is an actuatable airbag inflator having a chamber in which ignitable gas-generating propellant grains are disposed, said propellant grains having aligned central openings which define a central passage through which said conduit means extends, said propellant grains igniting in response to at least one of said pair of pyrotechnic transmission lines igniting.

8. The apparatus of claim 1 wherein said actuatable safety device is an actuatable seat belt pretensioner.

9. The apparatus of claim 1 wherein said indicator means is a lamp located in the vehicle compartment.

10. The apparatus of claim 1 wherein each of said pair of pyrotechnic transmission lines is made of a tube having pyrotechnic material therein.

11. An apparatus comprising;
    an actuatable airbag inflator for, when actuated, inflating an airbag to protect an occupant of a vehicle during a collision condition;
    an actuatable seat belt pretensioner for, when actuated, rotating a spool of a seat belt retractor in a belt retraction direction;
    a first ignitable pyrotechnic transmission line having one end connected to said actuatable airbag inflator for, when ignited, actuating said airbag inflator;
    a second ignitable pyrotechnic transmission line having one end connected to said actuatable seat belt pretensioner for, when ignited, actuating said seat belt pretensioner;
    firing manifold means connected to the other end of said first ignitable pyrotechnic transmission line and to the other end of said second ignitable pyrotechnic transmission line for receiving a firing signal indicative of a vehicle collision, said first and second pyrotechnic transmission lines igniting in response to said firing manifold means receiving said firing signal and thereby actuating said seat belt pretensioner and said airbag inflator to protect the occupant of the vehicle during the collision;
    means for monitoring the operability of said first and second pyrotechnic transmission lines, said monitoring means including signal means for providing a signal and including conduit means coupled at one end to said signal means for receiving said signal from said signal means and extending through said first pyrotechnic transmission line, through at least a portion of said actuatable airbag inflator, through at least a portion of said actuatable seat belt pretensioner, and through said second pyrotechnic transmission line, said conduit means directing said signal received from said signal means therethrough; and
    said monitoring means including sensor means coupled to the other end of said conduit means for sensing receipt of said signal directed through said conduit means and including indicator means responsive to said sensor means for indicating a change in said signal directed through said conduit means.

12. The apparatus of claim 11 wherein said airbag inflator includes a chamber in which ignitable gas-generating propellant grains are disposed, said propellant grains having aligned central openings which define a central passage through which said conduit means extends, said propellant grains igniting in response to at least one of said first and second pyrotechnic transmission lines igniting.

13. An apparatus comprising;
    actuatable means for, when actuated, providing protection for the occupant of a vehicle during a collision condition;
    a first ignitable pyrotechnic transmission line having one end connected to said actuatable means for, when ignited, actuating said actuatable means;
    a second ignitable pyrotechnic transmission line having one end connected to said actuatable means for, when ignited, actuating said actuatable means, said actuatable means actuating in response to either one or both of said first and second pyrotechnic transmission lines igniting;

firing manifold means connected to the other end of said first ignitable pyrotechnic transmission line and to the other end of said second ignitable pyrotechnic transmission line for receiving a firing signal indicative of a vehicle collision, said first and second pyrotechnic transmission lines igniting in response to said firing manifold means receiving said firing signal and thereby actuating said actuatable means to protect the occupant of the vehicle during the collision;

means for monitoring the operability of said first and second pyrotechnic transmission lines, said monitoring means including signal means for providing a signal and including conduit means coupled at one end to said signal means for receiving said signal from said signal means and extending through said first pyrotechnic transmission line, through at least a portion of said actuatable means, and through said second pyrotechnic transmission line, said conduit means directing said signal received from said signal means therethrough; and said monitoring means including sensor means coupled to the other end of said conduit means for sensing receipt of said signal directed through said conduit means and including indicator means responsive to said sensor means for indicating a change in said signal directed through said conduit means.

14. The apparatus of claim 13 wherein said actuatable means is an actuatable airbag inflator having a chamber in which ignitable gas-generating propellant grains are disposed, said propellant grains having aligned central openings which define a central passage through which said conduit means extends, said propellant grains igniting in response to at least one of said first and second pyrotechnic transmission lines igniting.

* * * * *